United States Patent [19]

Yates

[11] Patent Number: 5,711,509
[45] Date of Patent: Jan. 27, 1998

[54] ISOLATION GATE AND FRAME ASSEMBLY

[75] Inventor: James Yates, Edmonton, Canada

[73] Assignee: Eltec Inc., Edmonton, Canada

[21] Appl. No.: 674,012

[22] Filed: Jul. 1, 1996

[51] Int. Cl.$^6$ ............................................. F16K 3/12
[52] U.S. Cl. ........................ 251/175; 251/193; 251/328
[58] Field of Search ............................ 251/175, 193, 251/328

[56] References Cited

U.S. PATENT DOCUMENTS

| | | |
|---|---|---|
| 323,728 | 8/1885 | Pedder . |
| 327,618 | 10/1885 | Swindell . |
| 1,739,973 | 10/1929 | Mambourg . |
| 2,265,176 | 12/1941 | Kinzie ............................ 251/175 X |
| 3,052,456 | 10/1962 | Pugsley et al. ....................... 263/15 |
| 3,337,178 | 8/1967 | Gordon ................................ 251/56 |
| 3,576,198 | 4/1971 | Bessot ............................... 137/375 |
| 3,931,953 | 1/1976 | Allen ............................. 251/175 X |
| 4,093,245 | 6/1978 | Connor .............................. 277/237 |
| 4,176,673 | 12/1979 | Connor .............................. 137/240 |
| 4,280,522 | 7/1981 | Pechnyo et al. ....................... 137/72 |
| 4,298,372 | 11/1981 | Stover et al. ......................... 65/136 |
| 4,474,205 | 10/1984 | Dreyer et al. .................... 251/328 X |
| 4,493,311 | 1/1985 | Bachman ......................... 251/175 X |
| 4,566,671 | 1/1986 | Beson .............................. 251/159 |
| 4,666,270 | 5/1987 | Hager .............................. 251/326 |
| 4,783,048 | 11/1988 | St. Clair ........................... 251/129 |
| 4,944,488 | 7/1990 | Clayson ............................ 251/203 |
| 5,158,264 | 10/1992 | Le et al. ........................... 251/198 |
| 5,320,327 | 6/1994 | Beson .............................. 251/172 |
| 5,377,955 | 1/1995 | Baker .............................. 251/327 |
| 5,379,984 | 1/1995 | Coad et al. ......................... 251/298 |
| 5,413,140 | 5/1995 | Kimpel et al. ....................... 137/375 |
| 5,445,359 | 8/1995 | Beson .............................. 251/159 |

OTHER PUBLICATIONS

Bachmann Dampjoint Inc. produce information entitled "Flex–Seal" Guillotine Damper, 4 pages, Jan. 1996.

Special Report, Reliable dampers: Vital for today's powerplant by William O'Keefe, Senior Editor, Power, Oct., 1981, 16 pages.

Abstract of U.S. Patent No. 4,706,934, Brown, Nov. 17, 1987, 2 pages.

Abstract of U.S. Patent No. 4,951,919, Haglund, et al, Aug. 28, 1990, 2 pages.

Abstract of U.S. Patent No. 5,056,755, Jang, et al, Oct. 15, 1991, 1 page.

Abstract of U.S. Patent No. 5,338,006, McCutcheon, et al, Aug. 16, 1994, 2 pages.

*Primary Examiner*—John Fox
*Attorney, Agent, or Firm*—Anthony R. Lambert

[57] ABSTRACT

An isolation gate and frame assembly has a frame having a frame sealing surface extending around the frame and a fluid impervious gate having a gate sealing surface complementary to the frame sealing surface extending around the gate. One of the first and second sealing surfaces carries an inflatable seal. A mechanism is provided to locate the gate within the frame with the first sealing surface sealed against the second sealing surface.

16 Claims, 9 Drawing Sheets

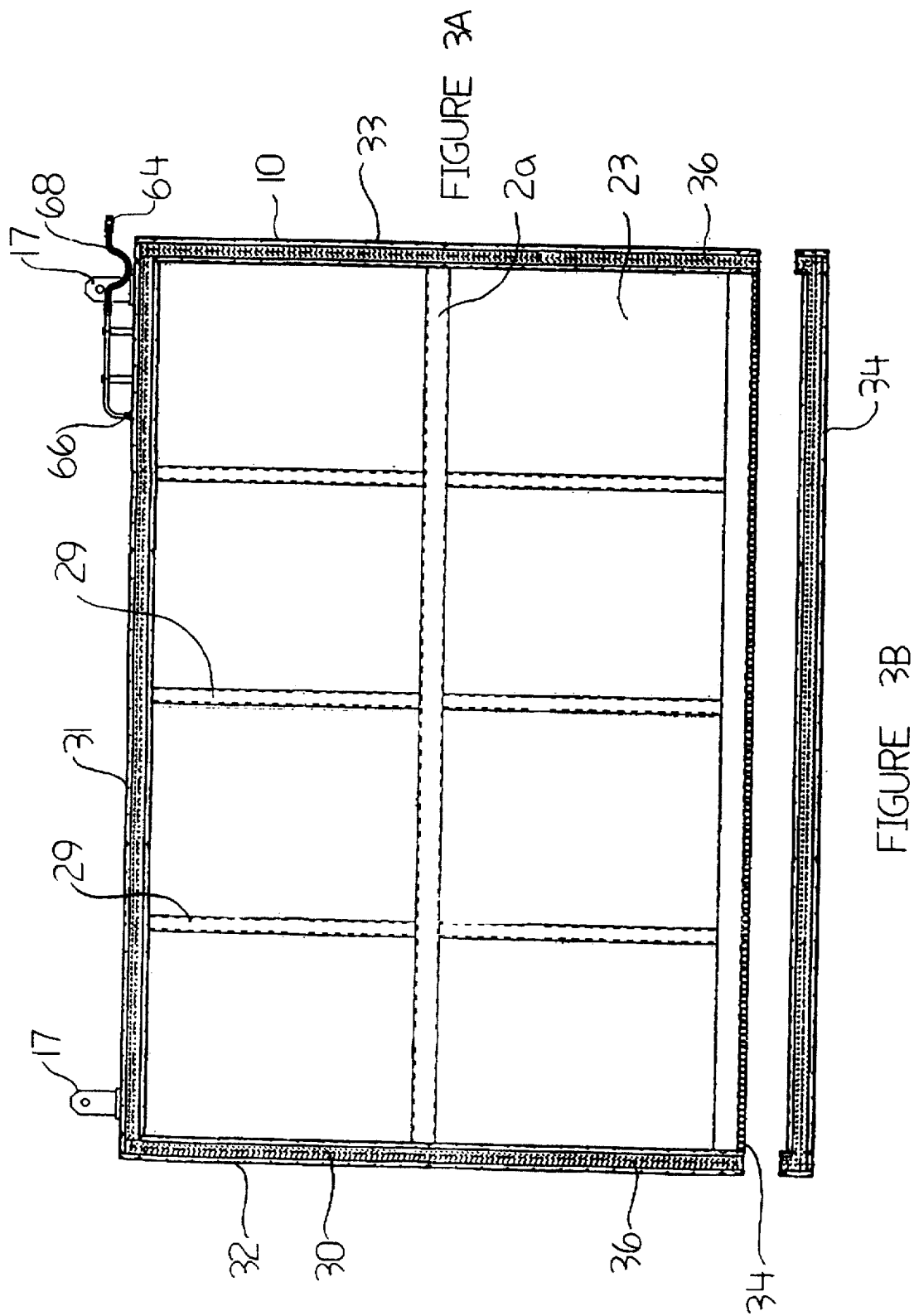

5,711,509

ISOLATION GATE AND FRAME ASSEMBLY

FIELD OF THE INVENTION

This invention relates to isolation gates and frame assemblies, particularly as used to isolate large exhaust ducts from boilers.

BACKGROUND AND SUMMARY OF THE INVENTION

When two or more exhaust ducts from two or more different boilers are attached to a common flue stack, it is sometimes desirable to shut down only one of the boilers while performing maintenance. The other boiler or boilers continue to operate. The boiler being worked on should then be isolated from the other boilers to prevent toxic gases moving into the boiler being worked on, and for this purpose it has been proposed to provide a gate across the exhaust duct leading to the boiler to be worked on.

Various methods have been proposed to ensure that this gate is sealed. However, in the experience of the applicant, prior methods for sealing exhaust ducts have proofed unsatisfactory. As one example, a guillotine gate has been used with air blown around the periphery of the gate. This type of gate requires a blower, with consequent maintenance difficulties, is not so useful in remote areas and consumes pressurized air. In one type of guillotine gate, the bottom edge of the gate falls into a slot in the duct, but such a slot must be kept cleaned to ensure that a seal may be made, resulting in additional expense and inconvenience.

The inventor has thus provided a new isolation gate and frame assembly, which according to one aspect of the invention, includes a frame having a frame sealing surface extending around the frame and a fluid impervious gate having a gate sealing surface complementary to the frame sealing surface extending around the gate. One of the frame and gate sealing surfaces carries an inflatable seal. A mechanism is provided to locate the gate within the frame with the frame sealing surface sealed against the gate sealing surface.

In accordance with a further aspect of the invention, there is provided an isolation gate and frame assembly that includes a fluid impervious sealing gate having a periphery; an inflatable seal extending around the periphery of the sealing gate; a frame for sealingly receiving the fluid impervious sealing gate; and means operatively connected to the fluid impervious sealing gate for moving the gate between a closed position and an open position.

In a further aspect of the invention, the fluid impervious sealing gate has a top edge, first and second side edges and a bottom edge, and a sealing face side; and the inflatable seal extends around the sealing face side adjacent the top edge and first and second side edges and extends along the bottom edge. By having the seal run along the bottom edge of the gate, the frame sealing surface in this area may be made flush with the duct flooring, thus avoid build up of contaminants.

In a still further aspect of the invention, the frame includes vertical seat members for sealing against the fluid impervious sealing gate; and vertical frame guide members spaced from the seat members more at the top of the frame than at the bottom and thus forming a tapered channel narrowing from top to bottom for receiving the fluid impervious sealing gate.

In a still further aspect of the invention, a sealed tube extends around the periphery of the fluid impervious sealing gate; the sealed tube includes openings extending through the sealed tube at intervals on the sealing face side of the gate along the top and side edges of the fluid impervious sealing gate and along the bottom edge of the fluid impervious sealing gate; and the inflatable seal is a diaphragm fastened across the openings.

In a still further aspect of the invention, the inflatable seal is fastened to the sealed tube with parallel hold down bars spaced from each other to form a recess for the inflatable seal.

In a still further aspect of the invention, the bottom edge meets the first and second side edges at first and second corners respectively and the inflatable seal is pinched at the first and second corners between adjacent hold down bars meeting at the corners.

These and other aspects of the invention are described in the detailed description and claimed in the claims that follow.

BRIEF DESCRIPTION OF THE DRAWINGS

There will now be described preferred embodiments of the invention, with reference to the drawings, by way of illustration, in which like numerals denote like elements and in which:

FIG. 3A is an elevation view of the isolation gate of FIG. 1 looking at the sealing face of the isolation gate;

FIG. 3B is a bottom view of the isolation gate of FIG. 3A;

DETAILED DESCRIPTION OF PREFERRED EMBODIMENTS

Figure 1:
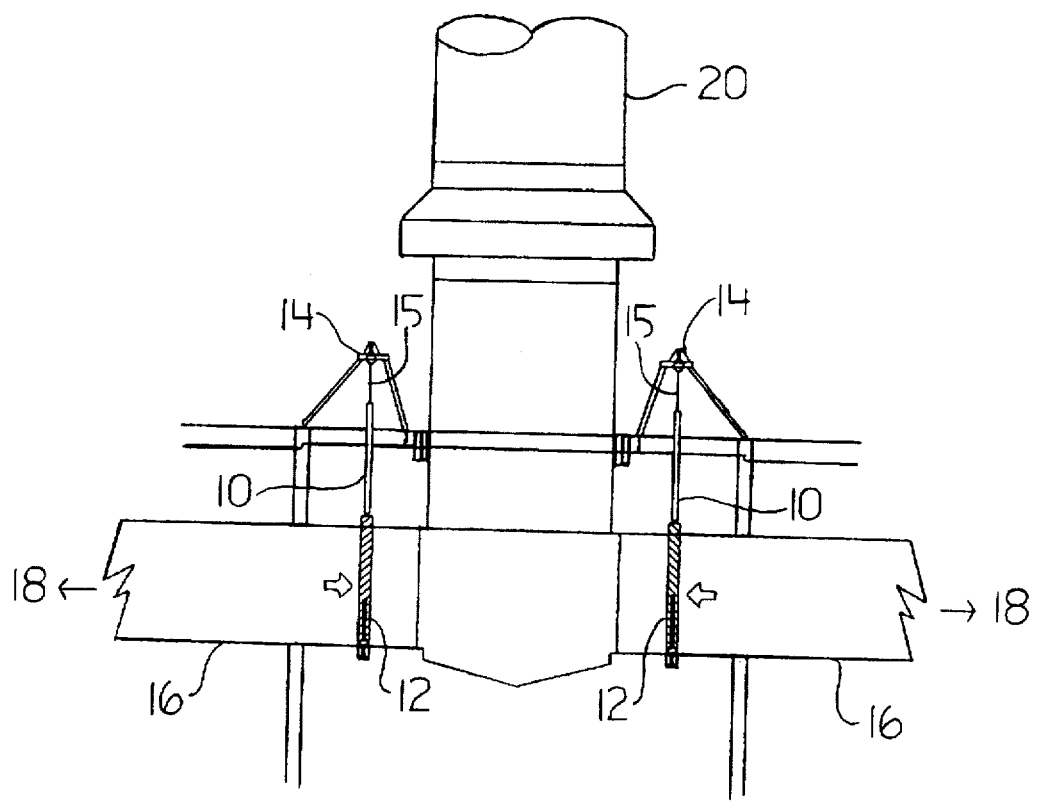
FIG. 1 is an elevation view of a pair of exhaust ducts connected to a common flue with a pair of isolation gate and frame assemblies according to the invention shown above the exhaust ducts in open position.
Figure 2:
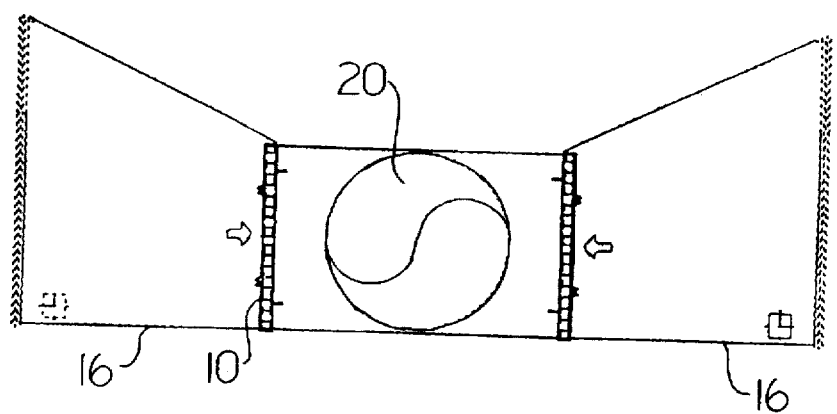
FIG. 2 is a plan view of the exhaust ducts and flue of FIG. 1.

Referring to FIGS. 1 and 2, a guillotine type gate 10 is shown in the open position hoisted above a gate frame 12 by hoist 14. In the closed position (FIG. 3C), the gate 10 slides into frame 12 and thus closes off the duct 16 and isolates boilers in the direction of arrow 18 from the common flue stack 20. The hoist 14 is operatively connected to the gate 10 by chains 15 detachably attached, as by hooks, to lifting lugs 17 (FIG. 3A) on the gate 10 for moving the gate 10 between open and closed positions.

Figure 3C:
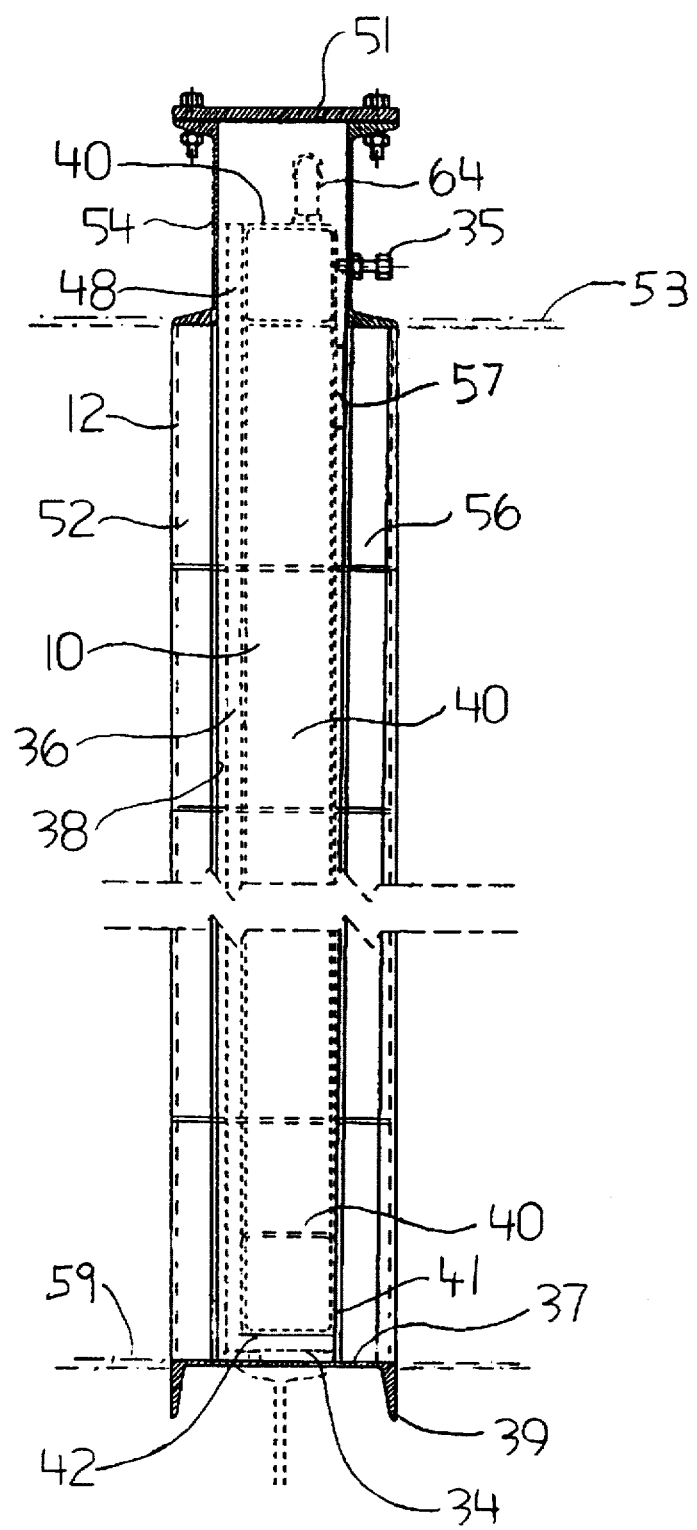
FIG. 3C is a section through the center (midway between side edges) of one of the isolation gate and frame assemblies shown in FIG. 1.

The gate 10 is shown in more detail in FIG. 3A, which shows an elevation view of the gate 10 showing a sealing face, and FIG. 3B, which shows a bottom view of the gate 10 showing the bottom sealing edge. The gate 10 is formed of a fluid impervious sealing plate 23 having a periphery formed of top edge 31, side edges 32 and 33 and bottom edge 34. Stiffening members 29 may be used to maintain the shape of the sealing plate 23. An inflatable seal 30 extends around the periphery of the gate 10. It sits on the sealing face 36 adjacent edges 31, 32 and 33 and runs across the bottom of the gate 10 along bottom edge 34. As the gate 10 slides into and is received by the gate frame 12, a taper in the gate frame 12 shown in FIG. 3C forces the sealing surface 36 into engagement with the gate frame. At the bottom of the gate when it is installed, there is no clearance between it and the frame as shown at 41. The bottom edge 34 seals against a channel iron 39 forming part of the duct flooring (FIG. 3C). The top and bottom of the duct are shown in FIG. 3C as elements 53 and 59 respectively. The sealing surface 36 is the contact zone on the gate between the gate and the frame. The sealing surface 38 is the corresponding contact zone on the frame. The sealing surface side of the gate is the side which contacts the frame.

Figure 5:
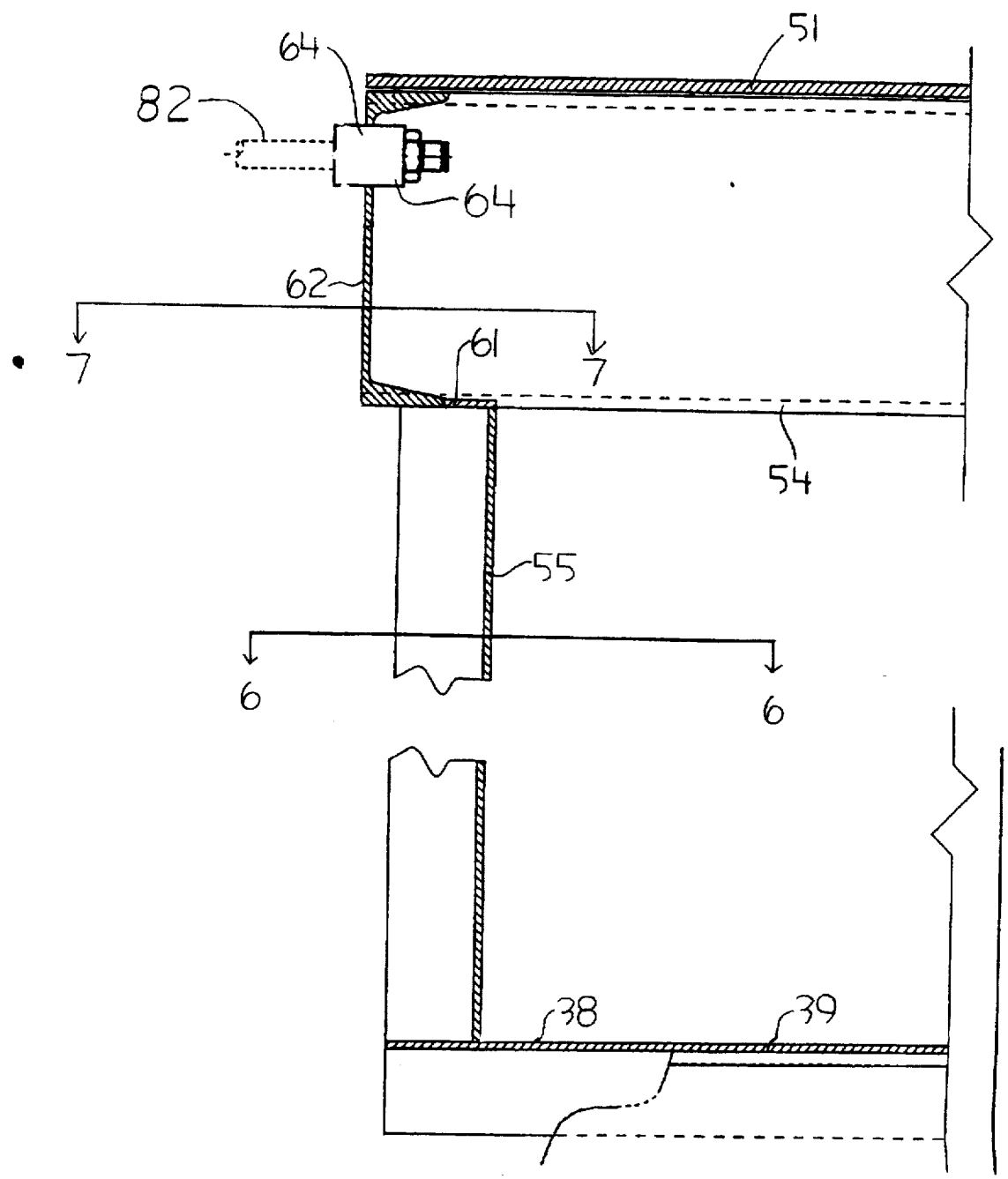
FIG. 5 is a lengthwise section through one side of a frame assembly used in the embodiment of FIG. 1.
Figure 6:
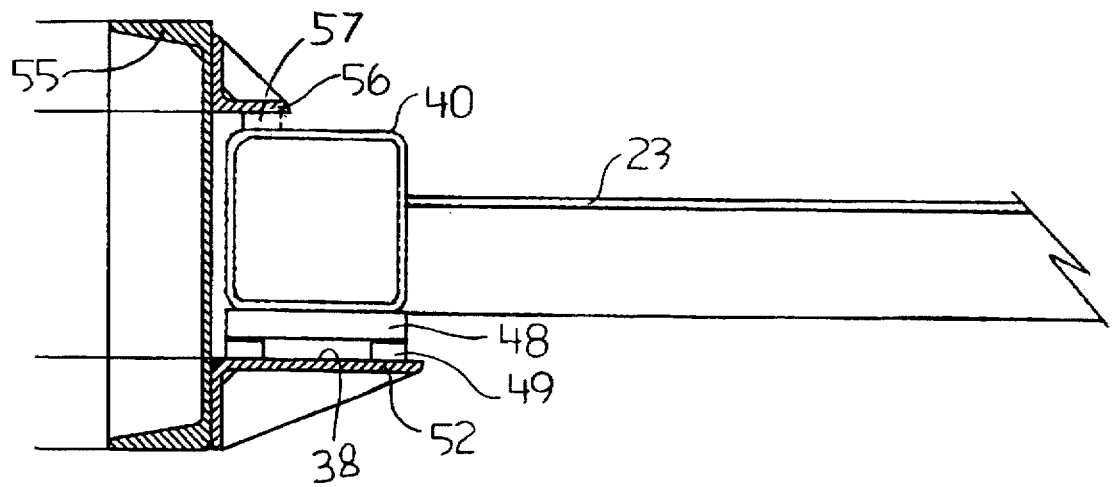
FIG. 6 is a section along the line 6—6 in FIG. 5, showing a side edge of the frame assembly shown in FIG. 1, with the gate shown in sealed position.
Figure 7:
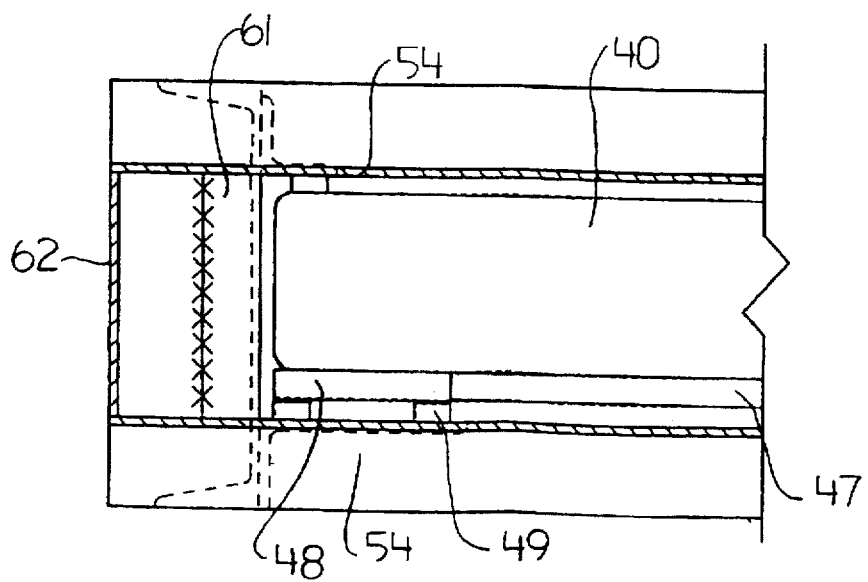
FIG. 7 is a section along the line 7—7 in FIG. 5, showing the top of a side edge of the frame assembly shown in FIG. 1.

FIG. 3C shows the gate 10 in dotted outline in closed position within the gate frame 12. Gate sealing surface 36 seals against a complementary frame sealing surface 38. Complementary in this context means that the shape of the sealing surfaces is the same, so that they may fit together to form a seal. The frame sealing surface 38 is seen in FIGS. 3C, 5 and 6, and is formed of angle irons 52 forming vertical seat members extending from the top to the bottom of each side of the frame assembly, and a channel iron 54 extending across the top of the frame assembly and resting on the angle irons 52 at either side of the frame 12. Channel iron 39 along the bottom of the frame assembly completes the sealing surface of the frame assembly.

As shown in FIG. 6, on each side of the frame assembly, the angle iron 52 is welded to a channel iron 55 that also extends from the top to the bottom of the frame assembly. A further angle iron 56 is welded to the channel iron 55 facing the angle iron 52. The angle iron 56 is spaced apart from the angle iron 52 and also extends from the top to the bottom of the frame assembly. The angle iron 56 forms a guide for the gate 10 as it is lowered into the frame assembly. As shown in FIG. 3C, the angle iron 56 is spaced from the angle iron 52 more at the top than at the bottom, thus forming a tapered channel. This tapered channel is formed at both sides of the frame. The angle iron 56 forms an off vertical guide member and, when the gate is closed, is on the side of the gate opposite to the sealing surface 38. Push blocks 57 (FIG. 3C and 6) are welded on to the back side of the gate 10 at either side of the gate. Two sets of push blocks 57 are used. An upper set is shown in FIGS. 3C and 6. A lower set on each side of the gate 10, not as thick as the upper set, are placed about in the middle (in the vertical sense) of the side edges of the gate. Upon lowering of the gate 10 into the frame 12, the taper pushes on the bottom of the gate and the push blocks and forces the sealing surface 36 against the sealing surface 38. Due to the push blocks 57, the sealing surface side of the gate 10 remains approximately parallel to the sealing surface of the frame as the gate 10 moves into place. Once the gate 10 is seated in the frame, the upper part of the gate 10 is urged against the top of the frame 12 by jacking screws 35. Three jacking screws 35 may be equally spaced across the width of the frame to prevent bowing of the gate away from the frame. The number of jacking screws to be used depends on the strength and span of the gate 10.

A plate 51 may be used to close off the frame 12. The plate 51 extends across the width of the frame 12 and is sealed to channel irons 54 (FIGS. 3C and 5) that extend across the top of the frame 12 and channel irons 62 and 54 that is welded to the top of the channel irons 55. A plate 61 is welded between the top of the channel irons 55 and the channel iron 62 to form a recess for the seal service air connection. On the other side of the gate 10, the corresponding channel iron 62 is reversed and sits on top of the channel iron 55. A quick connect coupling 64 is fitted in one of the channel irons 62 for use in delivering fluid to the inflatable seal 30. The primary purpose of the plate 51 is to seal the duct when the gate 10 is not in use, but may also be used to seal the frame when the gate is in the closed position. The flange 51 also assists in giving stiffness to the upper part of the frame to prevent it from spreading due to pressure exerted by the jackings screws.

Figures 4A, 4B:
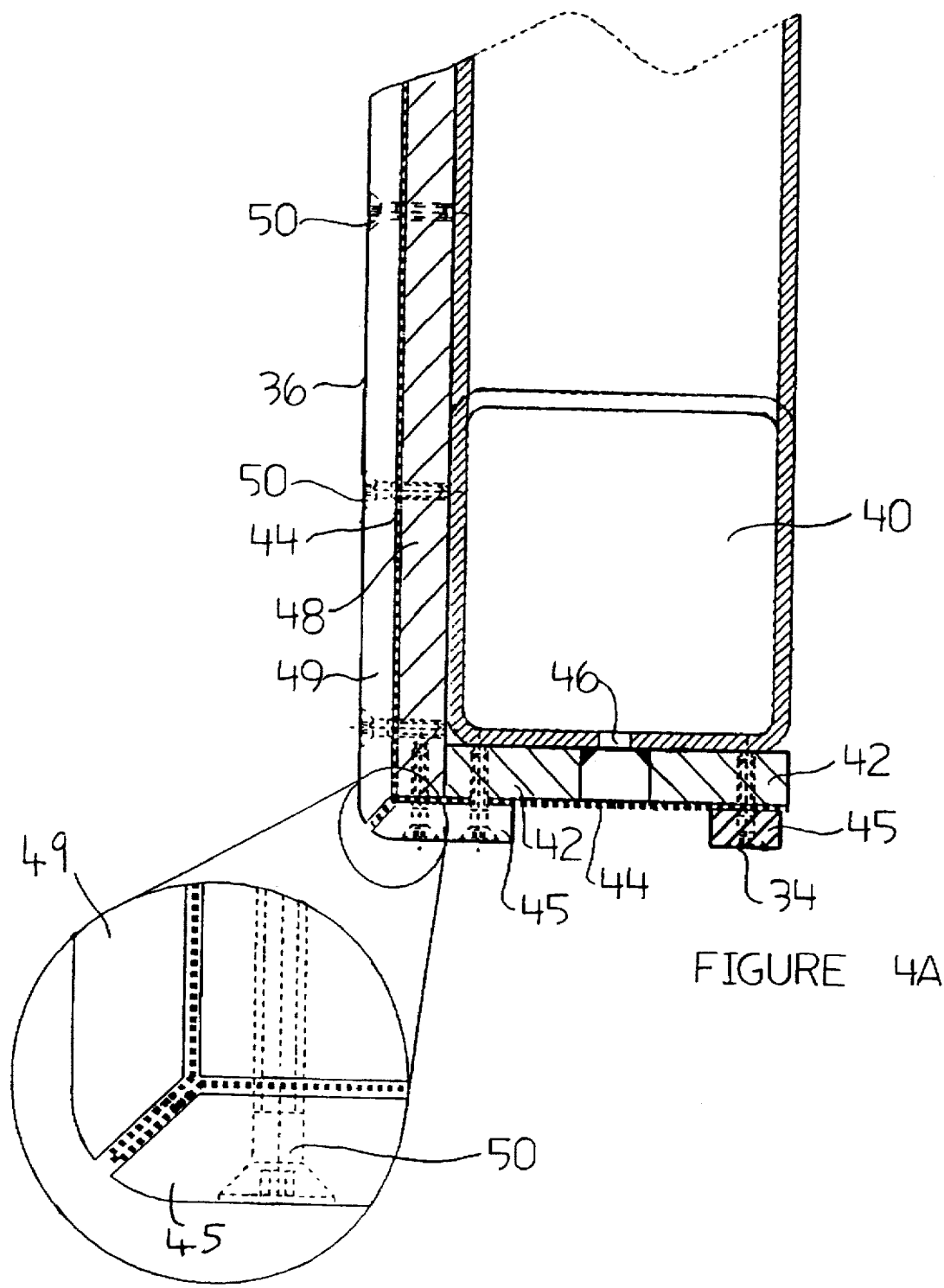
FIG. 4A is a section through a bottom corner of the isolation gate of FIG. 3A showing an inflatable seal and support tube with an opening in the support tube for delivering air to the inflatable seal.
FIG. 4B is a detail of the bottom corner shown in FIG. 4A.
Figure 4C:
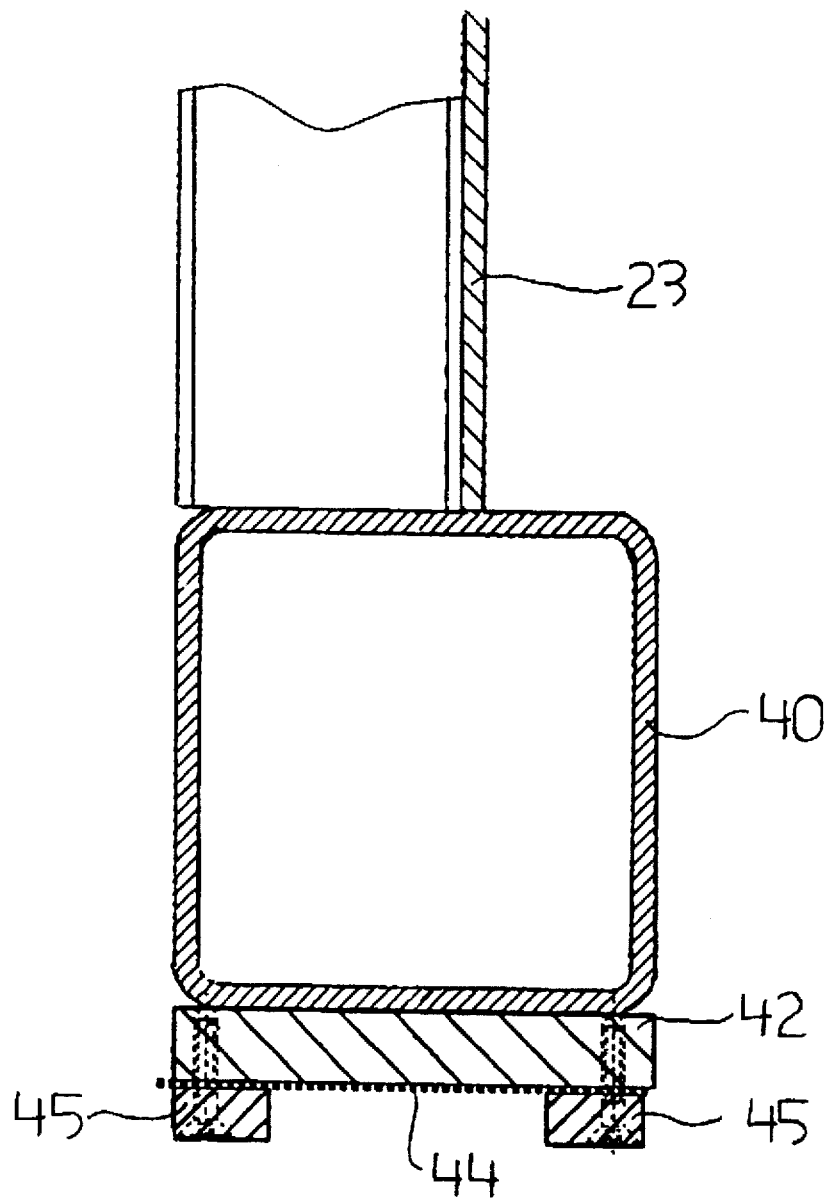
FIG. 4C is a section through a portion of the bottom edge of the isolation gate of FIG. 3A that does not pass through an opening through the support tube.

The inflatable seal 30 is best seen in FIGS. 4A, 4B, 4C, 6 and 7. In particular, sections through the bottom edge are shown in FIGS. 4A, 4B and 4C. A square steel tube 40 extends around the periphery of the gate 10. A plate 48 is welded to the tube 40 along each side edge of the gate 10. A similar plate 47 (FIG. 7) extends along the top edge of the gate 10, and a similar plate 42 extends along the bottom edge of the gate 10 as shown in FIG. 4A. Openings 46 in the tube 40, which openings also extend through the plates 42, 47 and 48, are spaced at intervals along the tube 40 around the periphery of the gate 10. The openings 46 are on the sealing surface side of the gate 10, and along the bottom edge 34 of the gate 10. A diaphragm 44 is secured across plates 42, 47 and 48 around the periphery of the gate 10 with spaced hold down bars 45 and 49 to form the inflatable seal. The spacing of the hold down bars recesses the diaphragm 44 so that the diaphragm is not easily damaged during closing and opening of the gate 10 yet allows the diaphragm 44 to expand under air pressure into contact with the sealing surface on the frame assembly.

The openings 46 in the tube 40 allow air in the tube 40 at very low pressure (about 3 psi) to expand the diaphragm 44 into sealing engagement with the sealing surface 38 formed of angle irons 52, and channel irons 39 and 54. Screws 50 secure the hold down bars 45 and 49 to the plates 42, 47 and 48. The heads of the screws 50 should rest below the surface of the hold down bars, for example about 1 mm below, and the screws 50 are preferably locked in place using a thread-locking material.

As shown in FIG. 4B, the joint between the diaphragm 44 along the bottom edge 34 and the diaphragm 44 on the sealing surface 36 is formed by extending the respective diaphragm 44 segments beyond the plates 42 and 48 and pinching them between extensions of the hold down bars 45 and 49. The pieces of diaphragm 44 that are pinched together should be bonded together. The diaphragm material should not extend beyond the radius of the hold down bars 45 and 49. This construction permits the use of sheet elastic sealing material rather than a pre-formed seal. The folding of the diaphragm 44 at the corner assists in preventing the diaphragm 44 from becoming worn at this point as it expands and tightens across the bottom corner of the gate during inflation of the diaphragm. Alternatively, the diaphragm material may be moulded to follow the contour of the sealing face.

Figure 8:
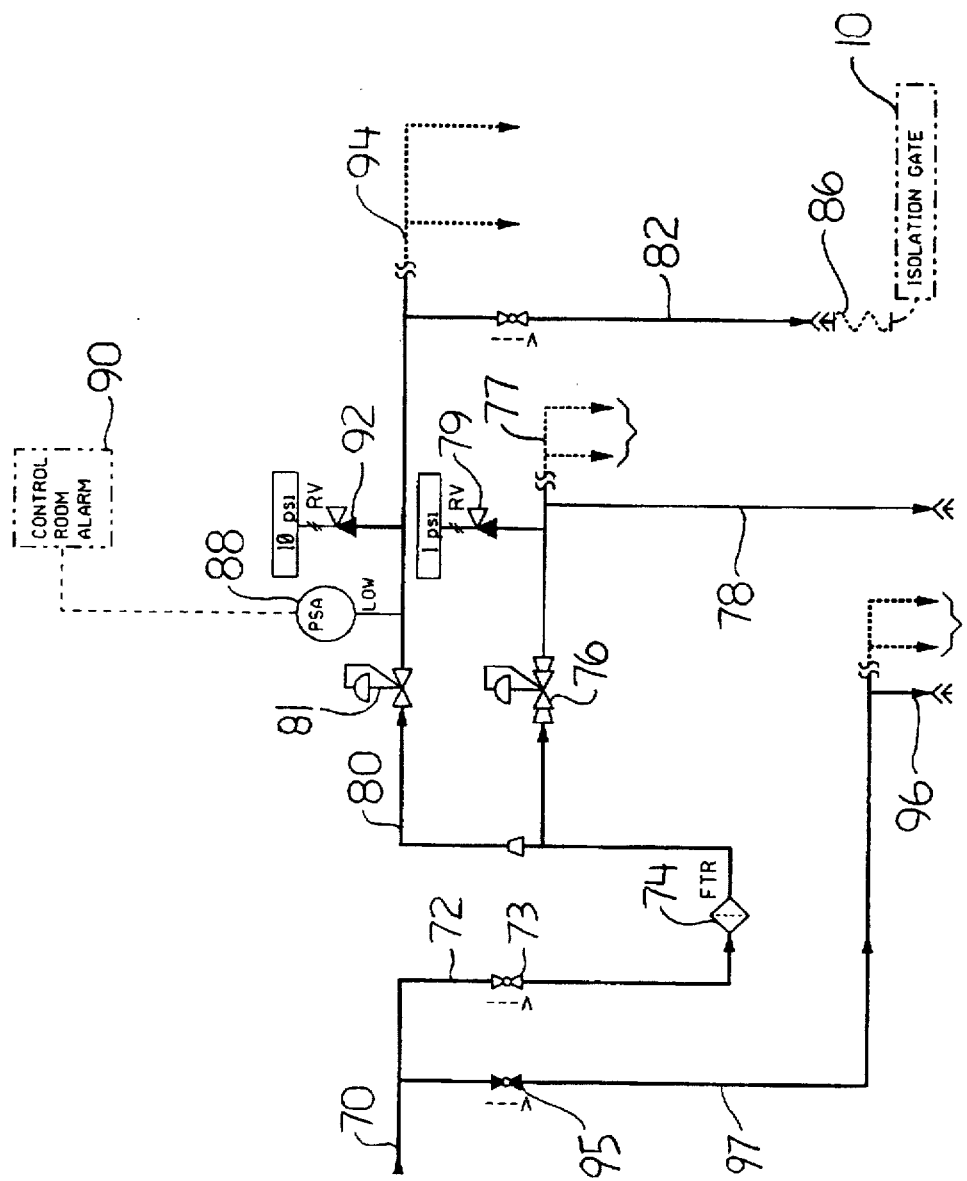
FIG. 8 is a schematic of an air supply system for use with the invention.

Fluid, normally air, is supplied to the tube 40 through a connection 66, hose 68 and quick connect coupler 64 at the top of the gate 10. Air is supplied by a conventional air compressor (not shown), with gauges and controls used for the supply of low pressure air as for example shown in FIG. 8. In the case where the gate of the invention is used in a boiler of a large industrial power plant, the air supply of the plant may be used as the air supply. Air from the plant air supply is provided to line 70 and passes along line 72 through valve 73, filter 74 and pressure regulating valve 81 on line 80 and passes out along line 82 to a flexible hose 86, which connects directly to the gate channel iron 62 and terminates with a quick connect coupler 64 at the isolation gate 10. Pressure regulating valve 81 is preferably set at about 3 psi for the supply of low pressure air to the inflatable seal 30 of the isolation gate. A pressure switch 88 on line 80 may be used to signal a drop in pressure below 3 psi and provide an alarm to control room alarm 90 indicating a leak that exceeds the capacity of the air supply to maintain the pressure at 3 psi. An overpressure relief valve 92 is also provided on line 80 to release pressure over a set pressure, for example over 10 psi. The air supply system may be used to supply other systems on line 94. For leak testing, conducted at lower pressure, an additional line 78 may be connected to air supply line 72 with pressure regulating valve 76 and overpressure relief valve 79 set at 1 psi. Leak tests are preferably conducted at very low pressure, below 1 psi. Additional leak test connections may be made through line 77. Air tools used for installation of the gate may be supplied through line 97 with valve 95.

The diaphragm 44 is preferably a continuous piece of silicone, for example part no. SIL-1 available from Anderson CP Rubber of Edmonton, Alberta, Canada. The diaphragm material should be sized to extend beyond the edges of the hold down bars. The diaphragm 44 should be sealed to the plates 42, 47 and 48 with a suitable bonding compound, for example such as is available from Anderson CP Rubber. Screw holes in the diaphragm 44 for the screws 50 should be punched out before installation using the gate as a template.

In operation, the gates 10 are normally raised above the ducts 16 and the frame is sealed by the plate 51. Safety pins (not shown) should be used to hold the gates 10 above the ducts 16 during normal operation of the ducts 16, since the typical mass of the gate, in the order of 1–2 metric tons. When one of the ducts 16 needs to be sealed to isolate one of the boilers (not shown), the gate 10 in that duct 16 is lowered using the hoist 14 to locate the gate within the frame with the sealing surface 36 sealed against the sealing surface 38. As the gate 10 enters the frame 12, it is guided into a sealed position against the frame by the push blocks 57 sliding against the angle irons 56. The bottom edge 34 of the gate 10 rests upon the upper surface 38 of channel iron 39.

To effect the upper horizontal seal along the top of the gate, the jacking screws 35 are used to press the gate 10 against the channel member 54, with cover plate 51 secured across the top of the frame 12, and air at low pressure, for example 3 psi, is applied to the tube 40 to expand the diaphragm against the frame 12. The pressure in the tube 40 can be monitored for leaks. When work on the boiler is finished, pressure in the seal can be released, the jacking screws pulled back clear of the opening at the top of the frame and the gate 10 lifted from the frame 12 using the hoists at either side of the gate.

Other methods of moving the gate 10 may be used rather than a hand operated block and pulley hoist as shown. For example, electric motors could be used, and, depending on the application, it is possible to hinge the gate to swing into the closed position. However, for large scale operation in the boilers of electric generating plants, hinged gates are not preferred. Rather, the gate should entirely be removed from the duct during normal operation thus permitting inspection and maintenance while the boilers are running.

Further, in the case of a swinging or hinged gate, the sealing surfaces 36 and 38, including the bottom edge of the gate 10 and the face 37 of the channel iron 39 forming the floor of the duct 16 may be angled to the plane of the sealing plate. However, this creates an obstruction to fluid and particle flow along the bottom of the duct, and it is preferred that the face 37 of the channel iron 39 be flush with the flooring of the duct 16 to prevent debris and liquid from piling up along the sealing surface.

It is also possible for the sealing face 38 on the frame 12 to have the inflatable seal, but this is not preferred in the situation of a gate for a duct since this leaves the diaphragm exposed to the gases in the duct during operation of the boilers, and also makes it harder and more expensive to replace as the equipment to which the duct is attached must be withdrawn from service to effect repairs. However, in those situations where the environment inside the duct to which the gate is to be applied is not damaging to the inflatable seal, the inflatable seal may be placed on sealing surface 38.

The gate may also be withdrawn into a gas tight bonnet above the duct for extremely toxic applications. In this case, the guide members at either side of the frame must be extended upward to control the movement of the gate into the frame.

Figure 9:
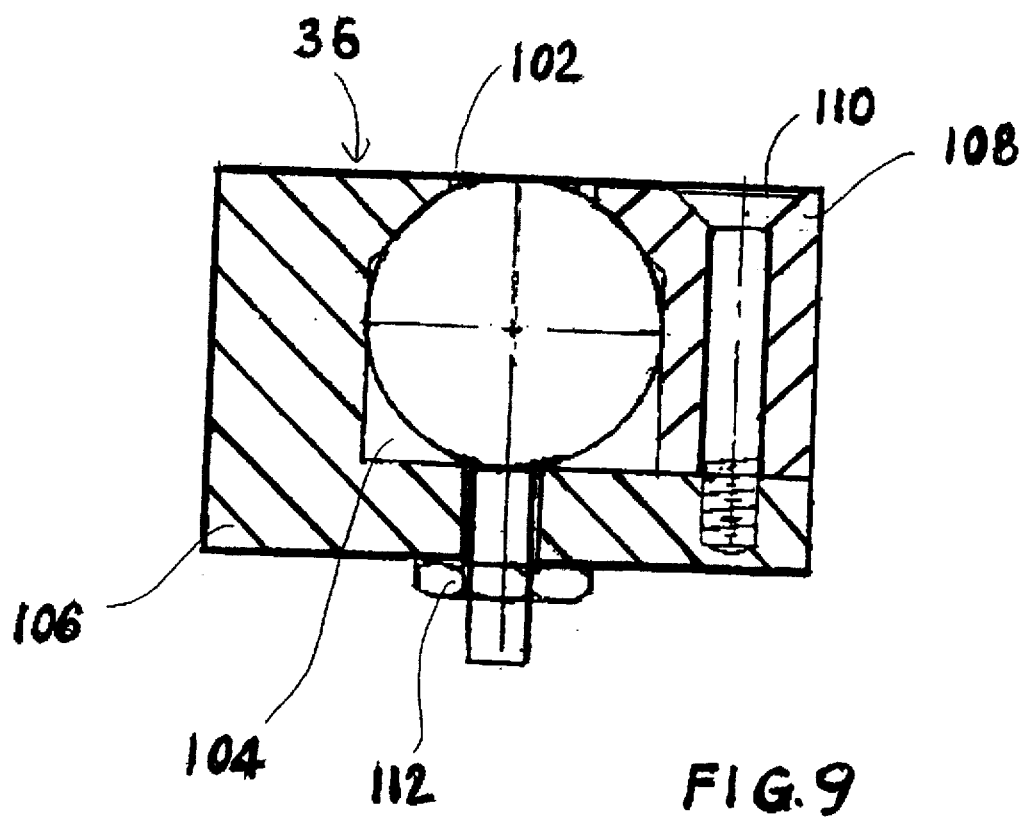
FIG. 9 is a cross-section through an alternative embodiment of a seal assembly for use with the invention.

Other embodiments of the inflatable seal may be used. For example, as shown in FIG. 9, the inflatable seal may be formed of a continuous tube 102 secured in a slot 104 defined between a base member 106 that is L-shaped in cross-section and a side bar 108 that is secured to the base member 106 by for example screws 110. The member 102 runs around the entire sealing face 36. The tube 102 may be inflated through coupling 112 which is secured in an opening in the member 106. When the tube 102 is inflated it bulges beyond the outer surface of the base member 106 and the side bar 108 to form a seal on the sealing face 36.

In another embodiment of the frame assembly, the upper surface of the duct flooring need not form a part of the sealing face 38. The duct flooring may be stepped downward in the direction of gas flow, with the vertical face of the downward step forming part of the sealing face 38. In this embodiment, the sealing face 38 is planar. Consequentially, the sealing face 36 may also be planar, and need not extend along the bottom of the gate 10. Rather the sealing face 36 may run adjacent the bottom of the gate in the same way that it runs across the top of the gate.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. An isolation gate and frame assembly for a duct carrying harmful material, the isolation gate and frame assembly comprising:
    a fluid impervious sealing gate having a periphery comprising a top edge, first and second side edges and a bottom edge, and having a sealing face side;
    an inflatable seal extending around the periphery of the sealing gate, the inflatable seal extending around the sealing face side adjacent the top edge and first and second side edges and extending along the bottom edge;

a frame for sealingly receiving the fluid impervious sealing gate; and means operatively connected to the fluid impervious sealing gate for moving the gate between a closed position and an open position.

2. The isolation gate and frame assembly of claim 1 in which the frame includes a top and bottom, and:

vertical seat members for sealing against the fluid impervious sealing gate;

vertical frame guide members spaced from the seat members more at the top of the frame than at the bottom and thus forming a tapered channel narrowing from top to bottom for receiving the fluid impervious sealing gate.

3. The isolation gate and frame assembly of claim 2 in which the means for moving the gate is a hoist.

4. The isolation gate and frame assembly of claim 2 in which the inflatable seal is recessed.

5. The isolation gate and frame assembly of claim 1 in which:

a sealed tube extends around the periphery of the fluid impervious sealing gate;

the sealed tube includes openings extending through the sealed tube at intervals on the sealing face side of the gate along the top and side edges of the fluid impervious sealing gate and along the bottom edge of the fluid impervious sealing gate; and the inflatable seal is a diaphragm fastened across the openings.

6. The isolation gate and frame assembly of claim 5 in which the inflatable seal is fastened to the sealed tube with parallel hold down bars spaced from each other to form a recess for the inflatable seal.

7. The isolation gate and frame assembly of claim 6 in which the bottom edge meets the first and second side edges at first and second corners respectively and the inflatable seal is pinched at the first and second corners between adjacent hold down bars meeting at the corners.

8. The isolation gate and frame assembly of claim 1 in which the means for moving the gate is a hoist.

9. The isolation gate and frame assembly of claim 8 in which the hoist is a block and pulley system operated manually.

10. The isolation gate and frame assembly of claim 9 in which:

the frame includes first and second pairs of spaced apart vertical members; and each vertical member of each pair of spaced apart vertical members being offset from the other vertical member of the pair to form a pair of tapered channels for receiving the fluid impervious sealing gate at either side of the isolation gate and frame assembly.

11. An isolation gate and frame assembly, comprising:

a frame having a first sealing surface extending around the frame, and having a top and a bottom;

a fluid impervious gate having a second sealing surface extending around the gate;

one of the first and second sealing surfaces including an inflatable seal;

the frame comprising vertical seat members for sealing against the fluid impervious sealing gate and vertical frame guide members spaced from the seat members more at the top of the frame than at the bottom and thus forming a tapered channel narrowing from top to bottom for receiving the fluid impervious sealing gate; and means to locate the gate within the frame with the first sealing surface sealed against the second sealing surface.

12. The isolation gate and frame assembly of claim 11 in which the inflatable seal is recessed.

13. The isolation gate and frame assembly of claim 11 in which:

the fluid impervious gate has a top edge, first and second side edges and a bottom edge, and a sealing face side; and the inflatable seal extends around the sealing face side adjacent the top edge and first and second side edges and extends along the bottom edge.

14. The isolation gate and frame assembly of claim 13 in which:

a sealed tube extends around the periphery of the fluid impervious gate;

the sealed tube includes openings extending through the sealed tube at intervals on the sealing face side of the gate along the top and side edges of the fluid impervious gate and along the bottom edge of the fluid impervious gate; and the inflatable seal is a diaphragm fastened across the openings.

15. The isolation gate and frame assembly of claim 14 in which the inflatable seal is fastened to the sealed tube with parallel hold down bars spaced from each other to form a recess for the inflatable seal.

16. The isolation gate and frame assembly of claim 15 in which the bottom edge meets the first and second side edges at first and second corners respectively and the inflatable seal is pinched at the first and second corners between adjacent hold down bars meeting at the corners.

* * * * *